July 13, 1954

F. S. FLICK 2,683,463

APPARATUS FOR PREVENTING CHURNING AND AERATION
OF LIQUIDS IN HYDRAULIC SYSTEMS

Filed May 24, 1950

INVENTOR.
FRANCIS S. FLICK
BY: *Schroeder, Merriam,*
*Hofgren & Brady*
ATTORNEYS.

Patented July 13, 1954

2,683,463

UNITED STATES PATENT OFFICE 2,683,463

APPARATUS FOR PREVENTING CHURNING AND AERATION OF LIQUIDS IN HYDRAULIC SYSTEMS

Francis S. Flick, Chicago, Ill., assignor, by mesne assignments, to Miller Fluid Power Company, a corporation of Illinois Application May 24, 1950, Serial No. 163,892

1 Claim. (Cl. 137—255)

This invention relates to apparatus for preventing churning and aeration of liquids in hydraulic systems, and more particularly in fast cycling hydraulic systems having small tanks for handling the liquid.

In fast cycling hydraulic systems, and especially in such systems having small tanks for handling the liquid, much trouble has been experienced, prior to the present invention, from the churning and undue aeration of the liquid in the tank when the liquid enters the tank at one end, and when air under pressure is introduced through the other end of the tank for exerting its pressure against the surface of the liquid in the tank in air-oil circuits. Such trouble has also been prevalent, prior to my invention, in typical pump circuits in which a pump is used for forcing the oil or other liquid through the circuit. This prior trouble has been due to the unrestricted entry of the high velocity flow of oil into the tank with an attendant high agitation of the oil in the tank; and in prior air-oil circuits such churning and aeration of the liquid was further aided by the high velocity air striking the surface of the liquid.

In the present invention I have overcome the above mentioned difficulties by providing a baffle in front of the open end of each of the inlet pipes of the tank or tanks, so spaced from the tank inlet pipe wall, and from the side walls, that the high velocity flow in the small area passage of the inlet pipe is converted into a low velocity flow in a large area passage between the baffle and the adjacent tank walls. This slows up the flow of the incoming liquid or air along the baffle so that, by the time it has passed through the space between the marginal edge of the baffle and the tank side wall, it will enter the tank in a quiet condition without causing churning or aeration of the liquid in the pipe. In other words, it spreads out radially in all directions from the central zone of the baffle and due to such rapidly increasing area its velocity of flow is rapidly and progressively slowed up to the marginal edge of the baffle and then through the space between the baffle edge and the tank wall with the above mentioned lack of churning and aeration.

I have found that, in order to achieve the best results, the height of the baffle is determined by dividing the circumference of the inlet hole into the cross sectional area of the inlet hole. For example, $$\frac{.25\pi D^2}{\pi D} = \tfrac{1}{4} D$$

where D is the diameter of the hole in the inlet pipe. By the expression "height of the baffle" is meant the perpendicular distance from the flat face of the baffle to the adjacent face of the tank end wall in which the inlet hole is formed. The distance between the marginal edge of the baffle and the adjacent side walls of the tank is also ¼ of the diameter of the hole in the inlet pipe. This results in converting the high velocity flow in the small area passage of the inlet pipe into a low velocity flow in a large area passage between the baffle and the tank head to prevent churning and aeration of the liquid in the tank.

Among the objects of the invention are: to provide a novel and improved apparatus for preventing churning and aeration of liquids in hydraulic systems; to overcome the disadvantages and accomplish the advantages referred to earlier herein; to provide a baffle which is spaced away from the adjacent tank inlet end wall a distance of approximately one-fourth of the diameter of the hole in the inlet pipe; to provide a baffle which at its marginal edges is spaced away from the adjacent side walls of the tank a distance of approximately one-fourth of the diameter of the hole in the inlet pipe; and such further objects, advantages and capabilities, inherently possessed by the invention, as will later more fully appear.

The invention is illustrated in a preferred embodiment in the accompanying drawing in which—

Figure 1:
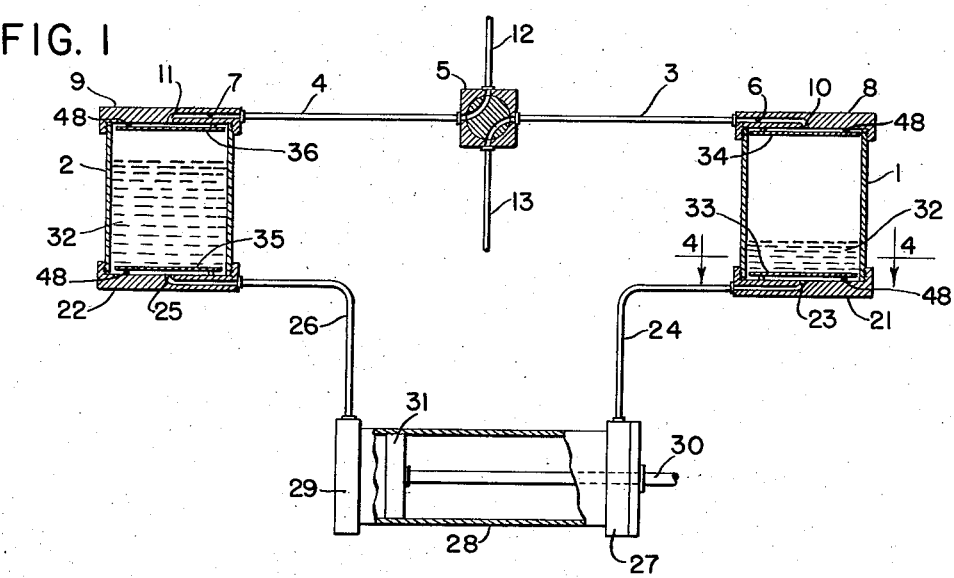
Fig. 1 is a longitudinal cross section, partly in elevation, of an air-oil apparatus embodying my invention.

In the embodiment shown in the drawing for illustrative purposes, the apparatus of Fig. 1 comprises a pair of tanks 1 and 2 connected at their upper ends by pipes 3 and 4, which pipes at their adjacent ends are connected with a four-way valve 5. Pipes 3 and 4 at their opposite ends are connected to interior passageways 6 and 7 in the upper heads 8 and 9 of tanks 1 and 2, respectively. The passageway 6 extends to the vertical center line of tank 1, where it joins with an inlet hole 10 opening downwardly through the center of the lower face of the top tank head 8, to form an inlet for air under pressure into the tank 1. Likewise, passageway 7 of the top head 9 of tank 2 leads inwardly and joins with an inlet hole 11 opening downwardly through the center of the lower face of said head 9 to form an inlet for air under pressure into tank 2.

Figure 3:
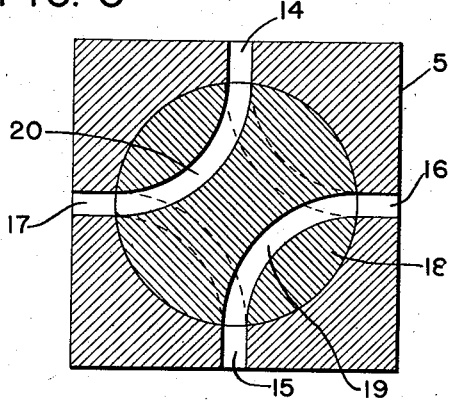
Fig. 3 is an enlarged transverse section of one form of four-way valve usable in the circuit of either Fig. 1 or Fig. 2.
Figure 4:
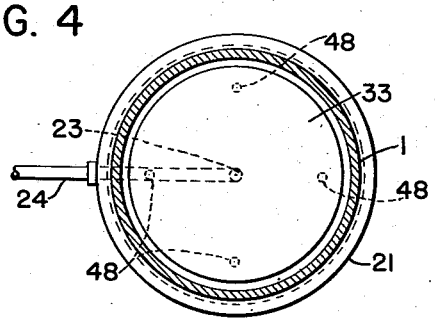
Fig. 4 is an enlarged transverse section on the line 4—4 of Fig. 1.

Connected with one side of the casing of valve 5 is an air inlet pipe 12 leading to any suitable supply of compressed air. Connected with the opposite side of the casing of valve 5 is an exhaust pipe 13 leading to the atmosphere, or any other point desired. Referring to Fig. 3, it will be seen that the casing of valve 5 is formed with an opening 14 to which supply pipe 12 is connected, and an opening 15 to which the exhaust pipe 13 is connected. Said casing is also formed with an opening 16 to which pipe 3 is connected, and an opening 17 to which pipe 4 is connected. The casing of valve 5 has rotatably mounted on its interior a cylindrical valve member 18 having arcuate ports 19 and 20, so positioned that when the valve member 18 is in the position shown in Fig. 3 port 19 connects opening 16 and 15, and port 20 connects openings 14 and 17. Rotation of valve member 18 through ninety degrees by any suitable means, will bring one of said ports into communication with openings 14 and 16, and the other into communication with openings 15 and 17, as shown by dotted lines in Fig. 3. This construction, by selective operation of valve member 18, enables introduction of air under pressure into either one of tanks 1 and 2 and exhaust of air from the other, as desired. It is thus seen that inlet holes 10 and 11 alternately function as exhaust or outlet holes.

Tanks 1 and 2 also have bottom heads 21 and 22 of construction similar to top heads 8 and 9, bottom head 21 having an inlet (or outlet) hole 23 connected with a passageway leading to pipe 24, and bottom head 22 having an inlet (or outlet) hole 25 connected with a passageway leading to pipe 26. Pipe 24 at its opposite end is connected to cylinder head 27 of hydraulic work cylinder 28, while pipe 26 is connected to the other cylinder head 29 of said work cylinder. Slidably extending through cylinder head 27 is a piston rod 30 having fixed to its inner end a piston head 31. It is thus seen that through manipulation of four-way valve 5, air under pressure will be admitted into the upper portion of one of the tanks (1 or 2) and exert its pressure against the oil or other suitable liquid 32 therein and force it to one end of the work cylinder 28, to move its piston in a corresponding direction, while the oil in the other end of the work cylinder is exhausted into the other tank and forces the air therein to exhaust. Upon completion of the above mentioned stroke of the piston, the valve member 18 of the four-way valve 5 is rotated through ninety degrees, preferably automatically, and operation of the work cylinder and tanks 1 and 2 takes place in the manner described above, but in the reverse direction.

In order to prevent churning and aeration of the oil, or other liquid, in tanks 1 and 2, there is provided in each of these tanks at each end of the interior thereof, a baffle, these four baffles being indicated in Fig. 1 at 33–36. Each of these baffles is positioned away from the inner face of the adjacent tank head a distance equal to one-fourth of the diameter of the hole of the inlet pipe in that head. The marginal edge of each of these baffles is also spaced away from the side walls of the tank a distance equal to one-fourth of the diameter of the hole of the inlet pipe in the adjacent tank head. This provides an outwardly increasing area for the oil or air passing through the inlet hole, and converts high velocity flow in a small area passage into low velocity flow in a large area passage. This so slows up the oil or air entering the tank that it prevents churning and aeration of the oil in the tank, and at the same time permits an easy flow into the tank of the oil or air, and an easy flow out of the tank when the operation of the work cylinder is reversed by the valve 5.

Figure 2:
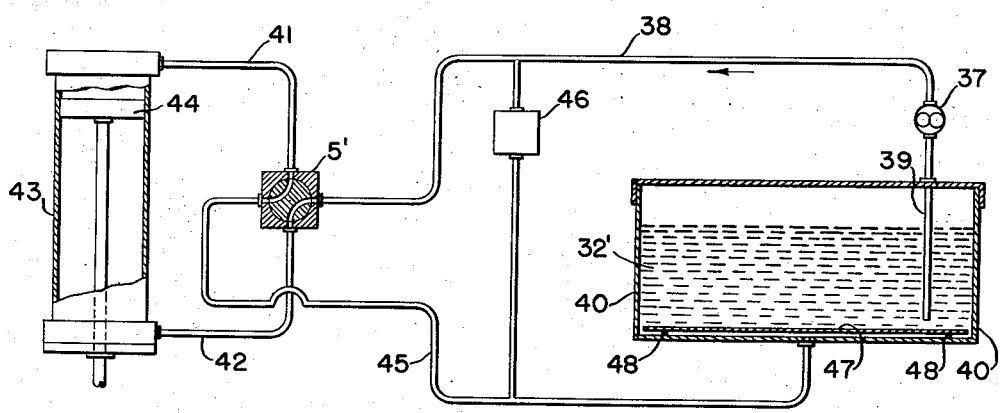
Fig. 2 is a similar view of an apparatus having a pump circuit.

The same principle of baffle construction and operation is embodied in the apparatus of Fig. 2, in which is shown a typical pump circuit having a pump 37 connected in the supply pipe line 38, the pump drawing oil or other suitable liquid through pipe 39 which extends down into the body of oil 32' in tank 40. Pipe line 38 leads to a four-way valve 5', similar to valve 5 in Figs. 1 and 3. By manipulation of valve 5', oil under pressure from pump 37 may be selectively introduced through either pipe 41 or pipe 42 to the desired end of work cylinder 43, to drive piston 44 in the desired direction. When oil under pressure is passing through pipe 41 to drive the piston, pipe 42 is functioning as the exhaust pipe to return the oil through valve 5', pipe 45 and into tank 40. When oil under pressure is passing through pipe 42 to drive the piston in the opposite direction, the exhaust oil passes through pipe 41, valve 5' and pipe 45 back to the tank 40. Pressure relief valve 46 is provided to return the oil back to the tank when a predetermined pressure in the line is exceeded.

Tank 40 is provided with a baffle 47 which is similar in construction, arrangement and operation to each of baffles 33–36, except for being somewhat larger in facial area and diameter. Regardless of the diameter of any of these baffles, their perpendicular distance from the adjacent face of the tank head, and their marginal distance from the side walls of the tank are one-fourth of the diameter of the hole of the inlet pipe in that head. Each of baffles 33–36 and 47 are supported on the adjacent tank head by any suitable number of spaced lugs or spacing members 48, which firmly fix the baffles in position but form practically no resistance to the flow of the fluid through the space between the baffle and the head.

The above described baffles are of especial value in fast cycling oil circuits and make it possible to use much smaller oil tanks without churning and aeration than was possible prior to the present invention.

The foregoing detailed description is given for clearness of understanding only, and no unnecessary limitations should be understood therefrom, for some modifications will be obvious to those skilled in the art.

Having described my invention, I claim:

In a fast cycling oil and air system for operating a work cylinder, a pair of operatively connected tanks each having a heat at each end and adapted to receive a varying amount of oil, and air under pressure thereabove, each of said heads having an opening alternately serving as an inlet and an outlet, each of said heads having closely adjacent thereto a flat baffle fixed in the tank and extending parallel to its adjacent head, the distance between the baffle and its respective head being approximately one-fourth of the diameter of said opening in that head, whereby to prevent churning and aeration of the liquid in the tank.

References Cited in the file of this patent

UNITED STATES PATENTS

| Number | Name | Date |
| --- | --- | --- |
| 913,832 | Lyon | Mar. 2, 1909 |
| 2,069,714 | Getchell | Feb. 2, 1937 |
| 2,198,291 | Poe | Apr. 23, 1940 |
| 2,207,057 | Gulick | July 9, 1940 |